United States Patent [19]

Ryan

[11] Patent Number: 4,503,466
[45] Date of Patent: Mar. 5, 1985

[54] APPARATUS AND METHOD FOR GENERATING OPTIMIZING PICTURES UNDER LOW LIGHT CONDITIONS

[75] Inventor: John O. Ryan, Cupertino, Calif.

[73] Assignee: Ampex Corporation, Redwood City, Calif.

[21] Appl. No.: 351,399

[22] Filed: Feb. 23, 1982

[51] Int. Cl.³ .............................................. H04N 5/34
[52] U.S. Cl. .................................... 358/211; 358/219
[58] Field of Search ............... 358/211, 209, 219, 222, 358/243, 310, 312, 313, 332, 345, 346; 315/386

[56] References Cited

U.S. PATENT DOCUMENTS

| | | | |
|---|---|---|---|
| 3,090,829 | 5/1963 | Lee | 358/211 |
| 3,652,154 | 3/1972 | Gebel | 358/211 |
| 3,716,657 | 2/1973 | Niemyer | 358/211 |
| 4,133,009 | 1/1979 | Kittler | 358/313 |
| 4,331,980 | 5/1982 | Ryan | 358/219 |
| 4,340,909 | 7/1982 | Yamada | 358/213 |
| 4,389,610 | 6/1983 | Davidson | 358/211 |

Primary Examiner—Tommy P. Chin
Attorney, Agent, or Firm—George B. Almeida; Joel D. Talcott

[57] ABSTRACT

The scanning process of a television camera is modified so that scanning is inhibited for N successive scan periods and is enabled during the next scan period, in a repeating cycle of (N+1) periods duration. The signal output generated during the N inhibited scan periods is zero but, during the enabled scan period, is (N+1) times greater than the corresponding signal which would be generated by conventional scanning action.

8 Claims, 7 Drawing Figures

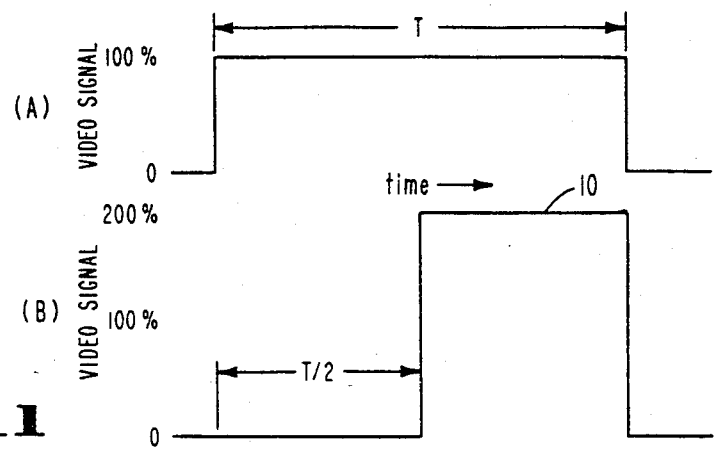
FIG_1
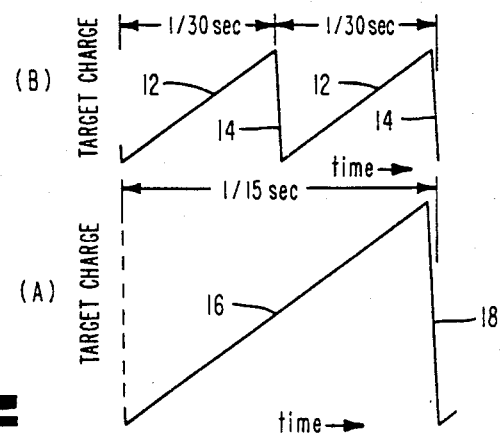
FIG_2
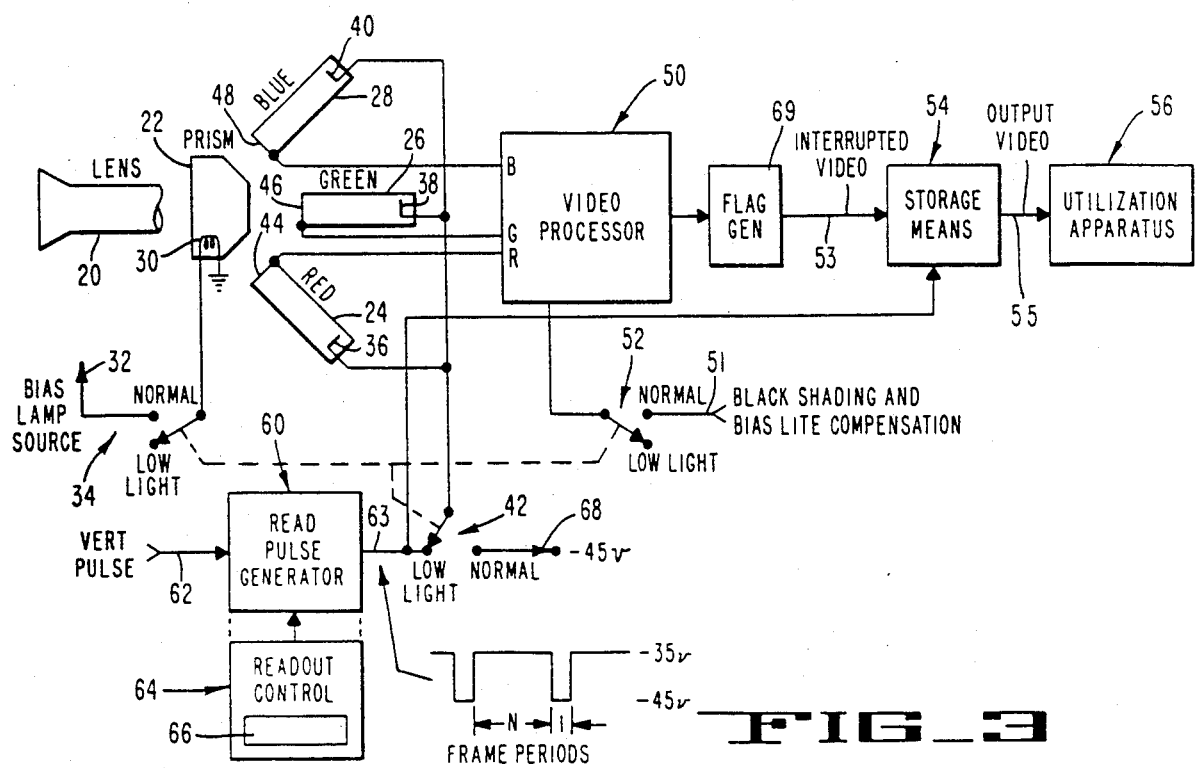
FIG_3

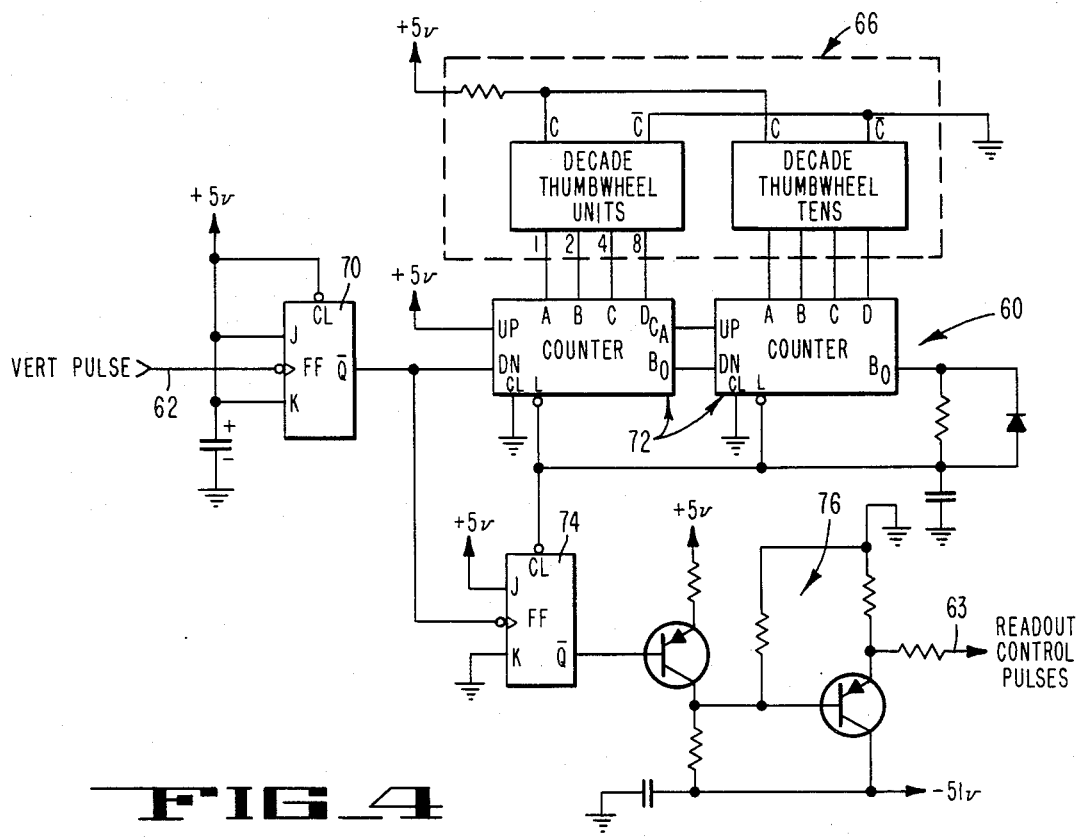
FIG_4
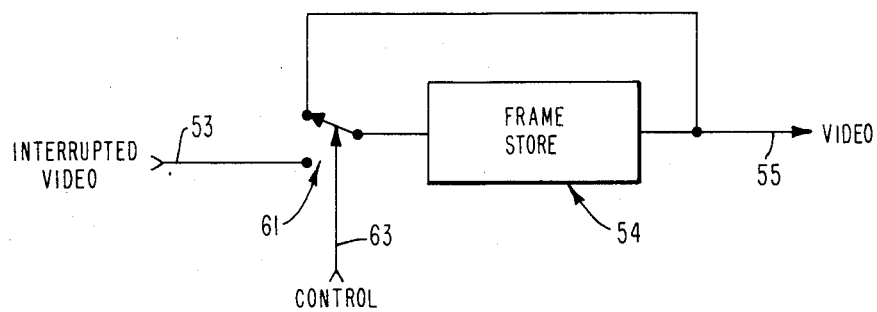
FIG_5

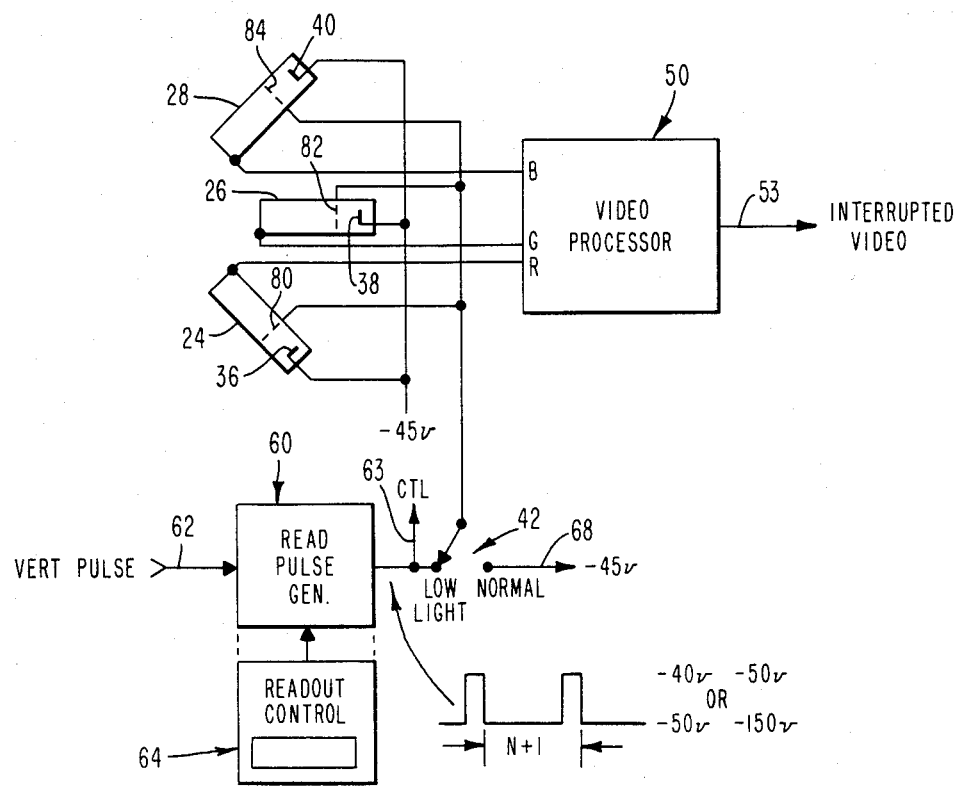
FIG_6
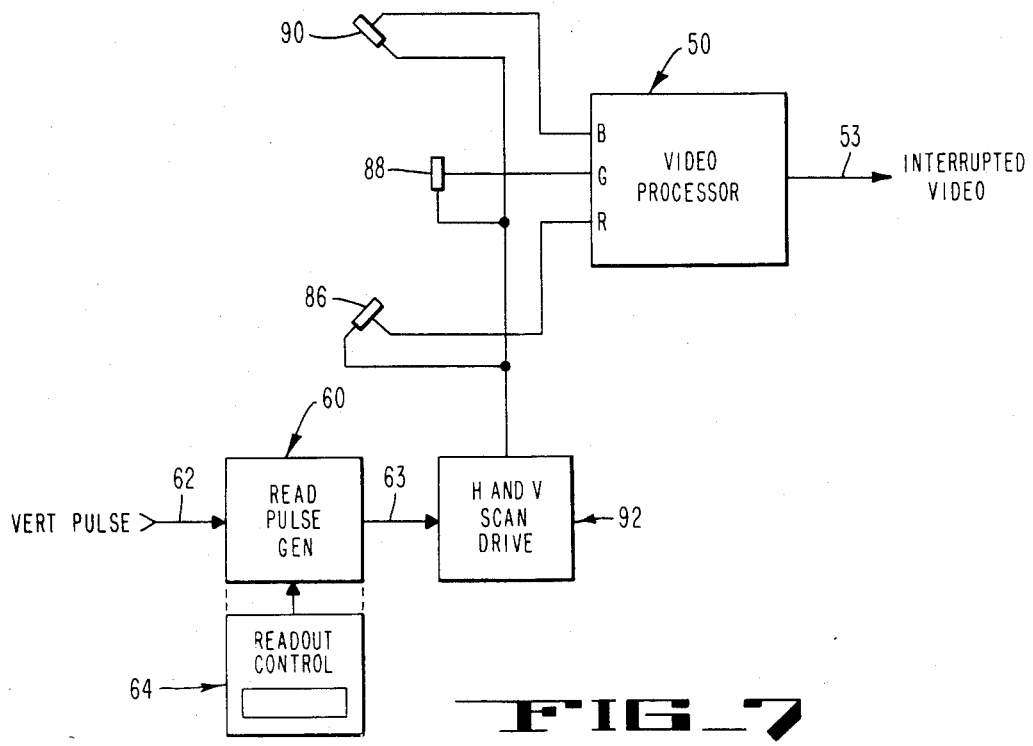
FIG_7

APPARATUS AND METHOD FOR GENERATING OPTIMIZING PICTURES UNDER LOW LIGHT CONDITIONS

BACKGROUND AND SUMMARY OF THE INVENTION

The invention relates to means for generating a high quality picture under very low ambient light conditions, and particularly to apparatus and method for producing high quality monochrome or color television pictures under conditions of very low ambient illumination.

In the field of television, and particularly in the fields of electronic news gathering (ENG), electronic field production (EFP), surveillance, etc., there are many instances such as, for example, under twilight or heavy overcast conditions, wherein television cameras cannot be utilized successfully due to the lack of sufficient ambient light to allow recording a scene. Under such low light level conditions, news gathering or other activities using television cameras are precluded, thereby limiting outdoor use of television cameras to daylight hours, or at best, early evening situations. Likewise, closed circuit surveillance systems are limited generally to indoor or outdoor applications where there is sufficient artificial lighting to allow the use of conventional industrial television cameras.

The only known low light level cameras are various types of highly specialized surveillance devices as those used, for example, by the military. Such devices are generally monochrome systems using special image intensifier tubes, are very expensive, and under normal illumination conditions are generally incapable of making color television pictures of a quality suitable for broadcast purposes. Thus such specialized devices can be used only for their intended purposes.

The invention overcomes the shortcomings of the above mentioned devices, by providing a relatively simple system for producing high quality moving or still color television pictures, under conditions of very low ambient illumination. Further, the system is applicable to present high quality cameras utilizing conventional image pickup tubes, which cameras inherently are capable of, and intended for, generating broadcast quality pictures under normal light level conditions. Thus a particularly valuable and heretofore unavailable application of the invention combination is in the field of electronic news gathering. An ENG camera with the capability of readily being switched to a low light level mode of operation permits the capture of newsworthy events which occur outdoors in deep twilight. At present, this has been well outside the capability of all existing ENG, or of all EFP cameras. As further described below, the primary drawback of the system is that the video signal is "interrupted"; i.e., the resulting pictures which are generated do not occur at the usual frame rate, and thus are discernable by a viewer as successive pictures of the scene. However, in accordance with the invention combination, various schemes are contemplated for generating continuous video pictures from the interrupted signal. In any event, when newsworthy events occur, successive periodic pictures of the scenes are far preferable to not being able to obtain any pictures at all.

Accordingly, the invention combination utilizes the principle that the signal current generated by a television image tube, or other similar sensor, throughout a specific time interval corresponding to a specific area of the imaged scene, is directly proportional to the corresponding illumination level on the sensor and to the integration time, i.e., to the period between successive scans of the specific area. In conventional television cameras, the integration time is fixed and is equal to the reciprocal of the picture repetition frequency, i.e., to the frame frequency (1/30 of a second in the NTSC color television standard, and 1/25th of a second in the PAL standard). In the invention combination, the scanning process used in a television camera is modified to inhibit scanning for N successive frames and to enable scanning during the next frame period, in a repeating cycle of (N+1) frames duration. It follows that the signal output from the sensor during the enabled, or "on", frame will be (N+1) times larger than the corresponding signal generated by conventional scanning action. However, the signal output is zero for the N inhibited, or "off", frames, thereby providing the interrupted video signal.

The interrupted video signal may be selectively manipulated to optimumize the final output video signal, depending upon the medium in which the video is to be used, the type or content of the video signal desired, etc. By way of example, the video signal from the camera may be recorded on a suitable video recorder and subsequently replayed in the "still frame" mode. Alternately, the video signal may be fed to a frame store, wherein the gaps in the interrupted video signal corresponding to the inhibited frames can be filled in with video generated during an adjacent enabled frame.

Accordingly, it is an object of the present invention to provide a system and method for producing high quality monochrome or color pictures under very low ambient light conditions.

It is another object to provide quality television signals under low ambient light conditions utilizing generally conventional cameras with conventional image pickup tubes.

It is still another object to provide quality television pictures in a television camera by selectively inhibiting and enabling the readout of given frames of information in a repeating cycle of frames generated by the camera.

Another object is to inhibit the readout of given frames in a repeating cycle of frames by selected manipulation of given elements of the scanning devices.

A further object is to provide optimum still or moving television pictures in low light conditions while still providing broadcast quality television signals during normal light level conditions.

A still further object is to optimize the effective sensitivity of an optical-to-electrical transducer under low ambient light level conditions.

BRIEF DESCRIPTION OF THE DRAWINGS

FIGS. 1A–1B is a graph illustrating video output signals for a camera without and with the invention system. FIGS. 2A–2B is a graph illustrating the charges on a given small portion of a target without and with the invention system.

FIG. 3 is a block diagram depicting one implementation of the invention combination.

FIG. 4 is a schematic diagram illustrating in further detail the block diagram of FIG. 3.

FIG. 5 is a block diagram exemplifying frame store apparatus for use in the system of FIG. 3.

FIGS. 6 and 7 are block diagrams of alternative embodiments of the invention combination.

DESCRIPTION OF THE PREFERRED EMBODIMENTS

For simplicity of description, it is assumed that a television camera is directed at a perfectly white chart, and thereby produces a constant white level video output signal, such as depicted in FIG. 1A. Given a signal of an undefined period of time T, if the area under the curve is effectively measured, it defines the total light that impinges the camera lens and the target of the tube thereof for that period of time T. Thus the signal may vary from zero at the base line, to 100% at its white level for the time period T.

If the scanning action is altered such that there is no readout during the first half of the time period T (FIG. 1B), and then there is readout during the second half of the period T, the resulting video signal 10 is zero for the first half and is twice the value of the 100% video signal for the second half of the period T. However, the area under the curve of the FIG. 1B is identical to that under the curve of FIG. 1A. Thus it may be seen that the signal generated on the target of the tube is dependent upon the intensity of the light and also upon the amount of time the light fell on the target.

In conventional television camera operation, the incoming light falls on the target for one frame (i.e., 1/30 second in the NTSC color television standard), whereupon the electron beam reads out (i.e., scans) the signal charge on the target for each frame to provide the corresponding television signal at 30 frames/second. In this case, the light has 1/30 of a second to build up an image on any given portion of the target.

Referring to FIG. 2A, it follows that for a constant amount of incoming light the charge at the given portion of the target builds up linearly as a function of time as depicted at numeral 12, since the light is falling constantly with time. After 1/30 of a second, the charge is read out and the video signal drops to zero value, as depicted at numeral 14. Thereafter the charge builds up again during the next 1/30 of a second, is read out again, etc., throughout a conventional scan process.

Referring to FIG. 2B, if the integration period is altered as discussed in FIG. 1B, to enable readout for only one frame out of two, the charge at the given portion of the target builds up to twice the value, as depicted at numeral 16, since the light is falling on the target for twice the amount of time. The target then is read out by the scanning beam after, for example, 1/15 of a second, as depicted at numeral 18.

In the situation of FIG. 2B, the resulting signal generated by the cameras is an interrupted video signal, viz, the camera output is a single flash of 1/30 second corresponding to a frame of information, i.e., a color television picture, followed by 1/30 second of darkness, followed by another 1/30 second flash of a single frame, followed by 1/30 second of darkness, etc. Therefore, the increase in effective sensitivity, viz, the doubling of the light level of the generated pictures, is accomplished at the expense of being able to obtain only one image in 1/15 second, instead of two images as would be generated in the conventional scan method of FIG. 2A.

Referring to FIG. 3, a simplified television camera system is depicted to illustrate the invention combination, and includes conventional lens apparatus 20, prism apparatus 22 for splitting the light supplied by the lens 20, and red, green and blue camera pickup tubes 24, 26, and 28 for receiving the separated light. Prism 22 is depicted herein as including a conventional bias light arrangement 30, which is coupled to a bias lamp source 32 via a switch 34, and operates in conventional fashion to flood the faceplate of the tubes to correct for lag effects. The cathodes 36, 38, 40 of the tubes 24, 26, 28 respectively, are coupled to the common side of a switch 42. The targets 44, 46, 48 of the tubes supply the red, green and blue color television signals, and are coupled to conventional video processor circuitry 50. Conventional black shading, bias light, etc., compensation circuitry, indicated by numeral 51, is coupled to the video process circuitry 50 via a switch 52. The compensation circuitry conventionally cancels out various detrimental effects on the video signals due to the bias light, black shading, etc.

The interrupted video signal supplied by the processor circuitry 50 herein is shown coupled via a line 53 to video storage means 54 such as, for example, a frame store, etc. The final output video signal is subsequently selectively supplied via a line 55 to a suitable utilization apparatus 56 such as, for example, a monitor, print-out apparatus, photographic camera, etc. The apparatus of storage means 54 and/or the utilization apparatus 56 is determined by the particular use to which the camera system is put.

A read pulse generator 60 receives a vertical sync pulse from the camera system sync generator (not shown) via an input 62 and generates therefrom read control pulses of selectable frequency on a read control line 63. The frequency of the control pulses is determined herein, by way of example only, by the setting on a read frequency control means 64, typically a pair of decade thumbwheels 66 (FIG. 4). Thus the read pulse generator 60 and read frequency control means 64 define a readout control means which inhibits or enables the scanning beam to readout the target, in response to the thumbwheel settings. A number corresponding to the desired readout frequency is dialed on the thumbwheels 66, as further described in FIG. 4. The generator 60 provides the read control pulses via line 63 to one side of the switch 42, and to a control input to the storage means 54 to control input to the storage means 54 to control the cycling of the pictures fed to the storage means. A second side of switch 42 is coupled to a −45 volt source 68 conventionally supplied to the cathodes of the tubes when the camera system is in normal operation. The switches 34, 42, 52 are mechanically connected to switch together.

In operation, when low light level camera operation is desired, switches 34, 42, 52 are switched to the low light level positions shown in FIG. 3. The bias light 30 is turned off since the light generated thereby generally would overpower the low light level from the scene. The compensation circuitry thus is no longer required, and also is disconnected. The cathodes 36, 38, 40 normally coupled to the −45 volt sorce, are coupled instead to the read pulse generator 60, which supplies pulses which vary in amplitude between −35 and −45 volts, at a frequency determined by the setting dialed on the thumbwheels 66. When the cathodes are at −35 volts the readout process is inhibited and the tubes integrate the incoming light. When the cathodes are at −45 volts the readout process is enabled and the target charges are read out to provide the red, green and blue color signals.

More particularly, when the read control signal is at −45 volts, the electron beams of the tubes are allowed to read out the respective targets. When the cathodes are pulled up to −35 volts, no further electrons will land on the target, readout is inhibited, and the target is allowed to build up charges corresponding to the time duration and the incoming light levels of the scene.

Thus, when the scanning process in a television camera is modified, for example, via the circuit of FIGS. 3, 4, scanning readout is inhibited for N successive frames and is enabled during the next frame, in a repeating cycle of (N+1) frames duration. The signal output from the tube or sensor is zero for the N inhibited frames, and during the enabled frame is (N+1) times larger than the corresponding signal which would be generated by a conventional scanning process. The interrupted video signal is then utilized via the storage means 54 and utilization apparatus 56 of FIG. 3.

More particualrly, the storage means 54 may be a videotape recorder in which the signal is recorded. In subsequent replay, the recorder is operated in the still frame mode whereby the interrupted signals generated by the camera system during the corresponding enabled frames are reproduced indefinitely as successive still pictures, can be fed to a print-out apparatus 56 and printed in the form of hard copies, photographed via a film camera, etc.

In an alternate system, the interrupted signals from the camera system are fed to a frame store, as depicted further in FIG. 5, whereby the inhibited frame time gaps are filled in with the video generated during the previous enabled frame. Thus, the frame store defining the storage means 54 is essentially any device which provides a one-frame delay of digital memory elements. A frame store switch 61 is inserted at the input to the frame store, whereby the output may be fed back to the input thereof. When the frame store is filled with one picture via line 53, the switch 61 coupled the output to the input of the frame store, whereupon the output video is a continuous succession of the stored picture at the normal frame rate. The switch 61 may be controlled, for example, via the leading edges of the read control pulses on line 63. Operation of the frame store 54 may be performed automatically by inserting a suitably timed flag pulse of, for example, a few microseconds length, in the vertical interval just preceding an enabled frame, thus instructing the frame store to enter the "write" mode. In FIG. 3, the flag pulse is inserted in the video signal via a flag pulse generator 69, shown herein as inserted in the output of the video processor circuitry 50. Since the insertion and detection of the flag pulse is conventional, no further description is provided.

The use of a frame store effectively captures the scene as a series of still pictures which occur every (N+1) frames. For small values of N, the effects of motion are reasonable well captured, and of course the effective increase in camera sensitivity is correspondingly small. Larger values of N provide correspondingly larger increases in camera effective sensitivity, however any motion in the viewed image which occurs during the (N+1) frames causes blurring in the resulting pictures fed to the storage means 54.

FIG. 4 exemplifies an implementation of the read pulse generator 60 and the read frequency control means 64 of FIG. 3. The circuit is essentially a counter with a controllable output pulse frequency determined by the settings dialed on the decode thumbwheels 66. That is, the pulse generator 60 supplies an output pulse which is low, i.e., −45 volts, for one frame out of (N+1) frames, wherein the thumbwheels are set at (N+1). To this end, the vertical sync pulse on input 62 is divided by two in a JK flip-flop 70 to provide one pulse per frame. The output is fed to a counter 72, which counts the incoming pulses and generates via a JK flip-flop 74 a single read control pulse output every (N+1) frames. Transistors 76 provide means for transforming the logic level signals of, e.g., 5 volts of the counter to the levels required for driving the tube elements.

Thus if the number 10 is dialed on the thumbwheels, the counter 72 generates one read control pulse of −45 volts for every 10 incoming pulses; a 10-to-1 integration sequence, which provides pictures with 10 times the light of a conventional scan process. If the number 30 is dialed on the thumbwheels 66, one read control pulse is generated for every 30 incoming pulses, with a 30-to-1 integration sequence.

The thumbwheels 66 can be set at numbers ranging, for example, from 2, 3, 4, 5, ... 15, 20, 30 (corresponding to one picture every second) 60, and even up to 90 (corresponding to one picture every three seconds). To date, useful pictures have been obtained with integration times of from 1/15 to one second, where one second times correspond to five F-stops of extra sensitivity.

Referring now to FIG. 6, an alternate method and circuit for modifying the camera readout process in accordance with the invention, is illustrated. Instead of controlling the cathodes, in the circuit the scanning beam is turned off by driving the grids 80, 82, 84 of the tubes with a suitable pulse. Thus, for example, in a diode-gun type of pickup tube, the read pulse generator 60 supplies read control pulses which vary from −50 volts to inhibit readout, to −40 volts to enable readout. In a conventional pickup tube, the read control pulses vary from −150 volts to inhibit readout, to −50 volts to enable readout. As shown, the cathodes 36, 38, 40 are coupled to −45 volts.

FIG. 7 depicts another method and circuit for modifying the scanning process in accordance with the invention, wherein the image tubes of the prior circuits are replaced with solid state sensors 86, 88 and 90. In this system, the prior switch 42 comprises generally conventional horizontal and vertical scan drive circuit 92. Readout is controlled by interrupting the horizontal or vertical, or both horizontal and vertical, scan drive signals to inhibit readout during the N frames, and enable readout during the (N+1) frame. The H and V scan drive 92 is coupled to the read pulse generator 60, and is controlled by the read control pulses on line 63.

Although there are various schemes for controlling the readout process as described herein, control of the cathode potential as in FIG. 3 is advantageous since such scheme allows the tube or sensor to read out, and thus suppress, highlights in the scene. That is, if a highlight has a sufficiently high light level to develop greater than 10 volts of charge on the target, it will be read out continually during the scanning process. This prevents excessive light from a street lamp, flashlight, etc., from spoiling pictures which otherwise would be obtainable using the low light level techniques described herein.

Several limiting factors exist in the present system. For example, dark currents are generated in the photosensitive layer of the target. Also stray light from the tube's heater filament may impinge the rear of the target. Further, integration of light over too long a time period may cause excessive blur in the pictures if there is any movement in the scene being viewed. The first two effects may be offset by cancellation techniques generally known in the art. Further, the dark current may be reduced by using a lower target voltage, and filament light leakage may be eliminated by employing relatively simple optical techniques to block the light. Excessive blurring is minimized by using values of N which are as small as possible, consistent with amount of reduced light available at the scene.

Although the invention combination has been described herein with respect to color television cameras, associated video storage apparatus and the field of color video in general, it is to be understood that the techniques and circuits are useful in any application or field wherein objects, images, etc., are viewed, scanned, etc., by means of, for example, optoelectrical transducers or sensors, whether tube or solid state, which are capable of being activated and inactivated, or otherwise controlled to allow selection of the amount of light which is collected prior to readout of a representative signal. Likewise, the storage means 54 may be any device capable of storing the information corresponding to the generated signal, and of selectively retrieving the information as desired; e.g., a tape or disk recorder/reproducer, a monolithic memory, i.e., frame or picture store or delay device, etc. Further, the invention may be used in cameras with any number of tubes, or which employ solid state image sensors rather than tubes.

What is claimed is:

1. System for increasing the effective sensitivity of an image tube during its readout scanning process, including means for inhibiting the image tube's readout scanning process for a selected plurality of inhibited scan periods of a given repeating cycle of scan periods, and for enabling the image tube's readout scanning process for a selected enabled scan period to generate a corresponding image tube output signal, comprising:
    recorder means including a videotape recorder for storing the output signal as successive pictures during the enabled scan period; and
    means integral with the videotape recorder for reproducing each successive picture in a still frame mode of operation during respective inhibited scan periods following each enabled scan period.

2. System for generating an optimized picture under very low ambient light conditions, the system including means for the readout scanning of a photosensitive surface, and means for enabling the means for the readout scanning of the photosensitive surface for an enabled scan period out of a selected cycle of scan periods, comprising:
    read pulse generator means for generating readout control pulses to initiate the enabled scan period, wherein the absence of readout control pulses from the read pulse generator means inhibits the means for the readout scanning of the photosensitive surface;
    solid state image sensor means defining said photosensitive surface;
    scan means integral with the means for the readout scanning, for generating a horizontal and vertical scan raster on the solid state image sensor means photosensitive surface; and
    wherein readout scanning of the photosensitive surface occurs during the enabled scan period.

3. A circuit for optimizing the effective sensitivity of an image tube having a repeating cycle of scan periods, comprising:
    a cathode element;
    source means for providing reference sync pulses at a rate corresponding to a television frame rate;
    read pulse generator means coupled to the source means for selectively supplying to the cathode element readout control pulses having a potential sufficient to enable readout only for a selected scan period of the repeating cycle of scan periods;
    processor means coupled to the tube for receiving a signal therefrom in response to the readout control pulses having said sufficient potential and for providing a corresponding interrupted output signal; and
    recorder/reproducer means coupled to the processor means for selectively storing the interrupted output signal and for selectively reproducing the previously stored interrupted output signal to define a corresponding succession of still pictures.

4. The system of claim 3 wherein the recorder/reproducer means include frame store means for storing the interrupted output signal as one frame of information, and for selective reproduction of the one frame during the repeating cycle of scan periods wherein the readout control pulses do not have a potential sufficient to enable readout.

5. The system of claim 3 further including:
    means coupled to said processor means for generating a flag timing pulse indicative of the occurrence of the readout control pulses; and
    wherein said recorder/reproducer automatically is responsive to the flag timing pulse to selectively store the interrupted output signal.

6. The circuit of claim 3 wherein the read pulse generator means supplies the readout control pulses as a cathode potential of the order of $-35$ to $-45$ volts during the selected scan period of the repeating cycle of scan periods.

7. The circuit of claim 3 wherein the read pulse generator means includes;
    frequency control means for determining the frequency of the readout control pulses commensurate with a selected range of numbers of the order of from 2 through 90 representative of the repeating cycle of scan periods; and
    counter means coupled to the source means and responsive to the frequency control means to generate the readout control pulses.

8. A method for increasing the effective sensitivity of an image tube during a readout scanning process, comprising;
    inhibiting the readout scanning process of the tube for a selected plurality of inhibited scan periods;
    allowing the integration within the tube of incoming light during the plurality of inhibited scan periods;
    enabling the readout scanning process for an enabled scan period following the inhibited scan periods;
    the step of enabling further comprising controlling the tube's cathode potential to allow readout thereof as an enabled signal only during the enabled scan period;
    storing the enabled signal during the enabled scan period; and
    reproducing the enabled signal during the inhibited scan periods to define a succession of still pictures.

* * * * *